Patented Aug. 24, 1926.

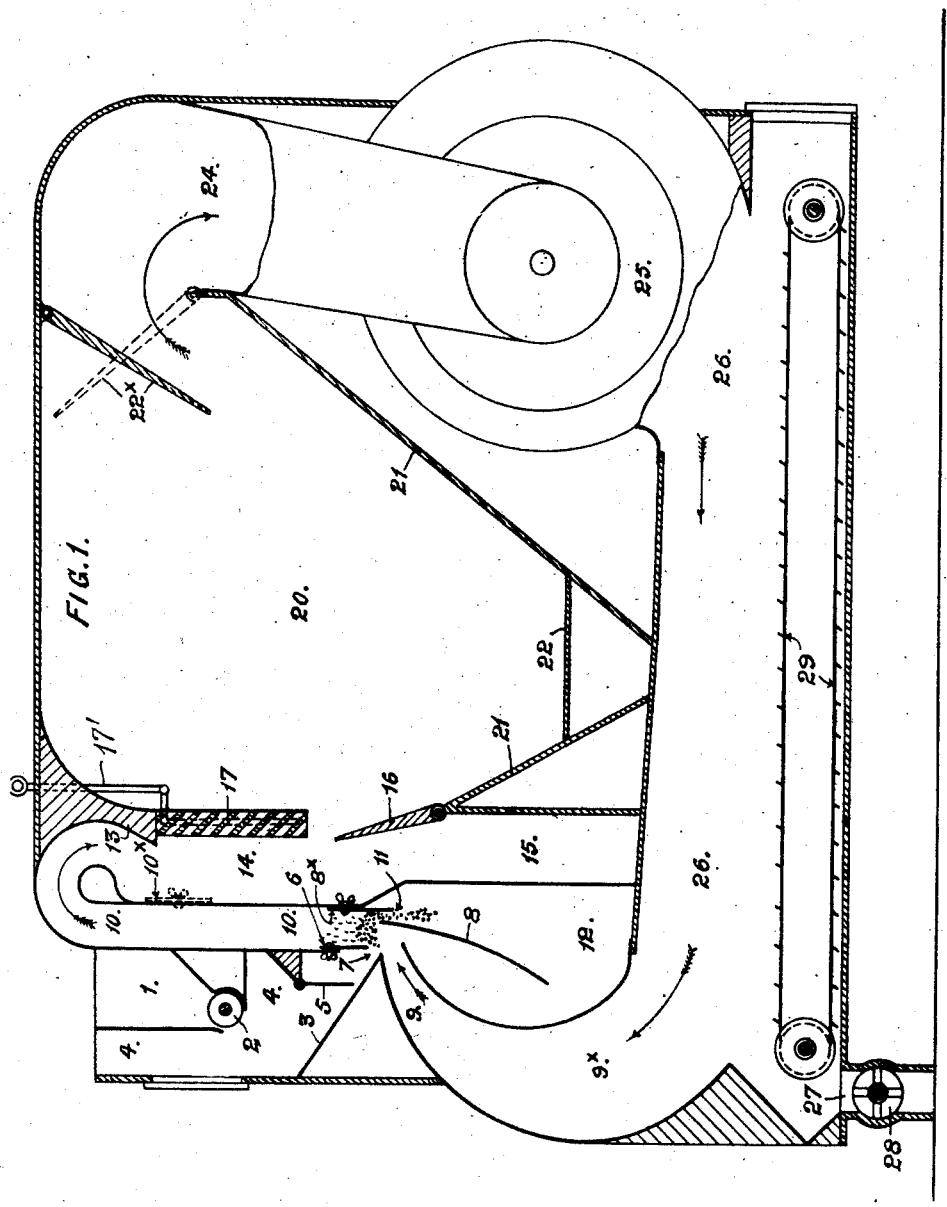

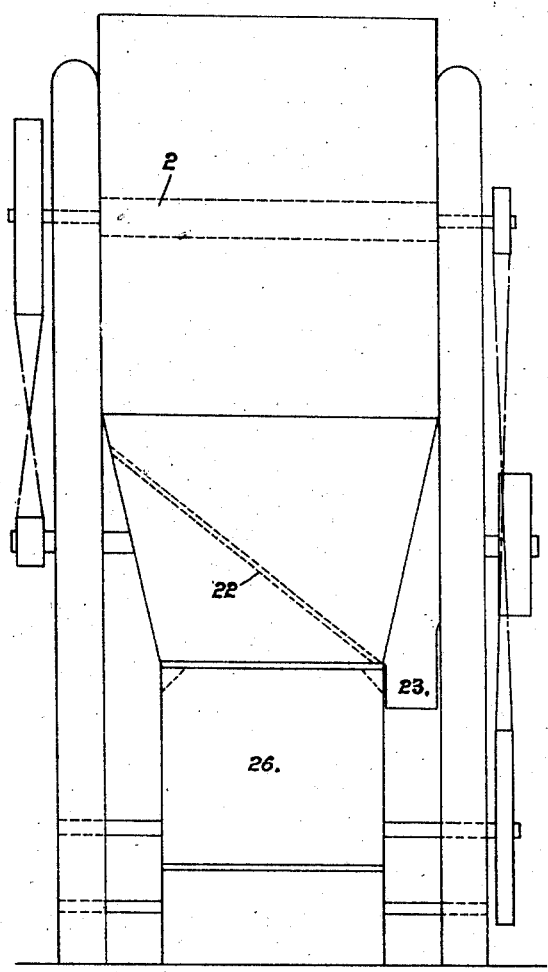

1,597,261

UNITED STATES PATENT OFFICE.

JOHN FREDERICK BISHOP, OF WALLASEY, ENGLAND.

GRAIN, FIBROUS, AND OTHER MATERIAL PURIFYING MACHINE.

Application filed November 24, 1923, Serial No. 676,820, and in Great Britain November 29, 1922.

This invention has reference to machines for purifying or separating impurities from grain or cereals or broken granular material, fibrous or other material, and it relates more particularly to that type of machine in which the material is acted upon by an air current, and the lighter materials are separated from it, and delivered into an expansion chamber more or less at a high velocity, wherein the particles of different specific gravities fall down at different points of its travel through the chamber, and are separately collected in suitable receptacles, and the air ridded of a large portion of the particles and dust, is forced, say by a fan or blower, back into the apparatus and re-used for operating upon fresh grain or material.

According to this invention, the stream of grain or material to be treated is fed into the apparatus, and is acted upon by a body of air at high velocity, and the air is subsequently passed through a chamber at low velocity, in its travel through which the finer particles separate and deposit, and the air is subsequently passed into a fan, and delivered thereby into a return conduit, whence it passes into a conduit of decreasing area, and from the reduced discharge end of which it is delivered into the grain or material as aforesaid.

Further, the air which is passed through the stream of inflowing material, passes through an up-cast trunk, and then is delivered in a downward direction so that the particles in the air are thrown down at a high velocity and deposited, and then the air passes slowly through the chamber wherein the deposit of light material takes place.
The stream of material is fed on to a plate or body adjacent to the air delivery conduit and projecting into the upcast trunk through which the air after passing through the material passes; and a chamber is provided beneath the said plate or body, the passages on either side of which are open to or communicate with the said upcast trunk.

The grain may be fed into the apparatus by a rotary feed roll or the like, and passed into the zone of pneumatic action past a spring valve, into and across the passage through which the air is being forced.

The grain falls down through the opening into which the air flows, between the inlet opening for the material and the plate or body, and is led by same and falls therefrom down into the receptacle for the good grain or material.

In the main settling chamber, at the lower part, there may be several partitions, forming the bottom into a plurality of receptacles, and the material of different specific gravities or size will fall into these, the heavier falling into the first, and the lighter into the second, and the lightest in one or further receptacles, which in some cases may be used.

These partitions between the receptacles may have each a flap, hinged below, so that its upper edge may be moved into different points in the direction of flow of the air, so that the chambers, as regards the different zones of collection, may be varied at will, as required.

In some cases, a baffle such as louvred baffle may be arranged across the settling chamber, the louvres of which may be fixed or movable, which control the flow of air and direct it down so producing a settling or depositing effect on the particles in the air.

The discharge aperture for the air from the main depositing chamber, after the greater particles and dust have been deposited, is at the upper part of the machine, and is provided with a hinged flap or valve, by which the exit of the air is controlled; and a duct connects this discharge aperture with the fan or air forcing means, which in turn, forces the cleaned air back through a conduit below into the supply air conduit, and upwards through the aperture or opening for same above described.

In the drawings, Figure 1 is a sectional elevation of a machine according to the invention, and Figure 2 is an end view.

Referring to the drawings, 1 is the feed hopper into which the material is introduced, having in it a feed delivery roller 2, adapted to deliver the material on to the inclined floor 3 of the chamber 4.

5 is a pendant hinged flap valve, which is moved away by the grain or material flowing down the inclined bottom 3; and 6 is a vertically adjustable valve or damper regulating the aperture 7, which works in conjunction with the bottom end of the floor 3, and by which the degree of opening or area and the quantity of material supplied is controlled.

The stream of material is delivered towards the inclined face of a plate or body 8, and through the stream, air delivered at a high velocity and under some pressure, from the diminishing delivery trunk 9, is passed; the air being supplied by the fan. The air is directed in an oblique and upward direction, and passes in this manner up through the stream of material.

The pressure and velocity of the air are such that the stream of grain or material is lifted up over the plate or body 8, and falls down on the back side of same through passage 11 to chamber 12, and thus the flow of air up the trunk is not interfered with. The particles removed from the material are carried up into and through the upcast trunk 10.

The air delivered into the trunk 10, is delivered at a high velocity and in condensed volume; and the trunk at the upper part is curved into the form of an expanded part 13, and the air is thus delivered in a downward direction into the passage 14, and toward the wall of the conduit away from the chamber 20 and the particles containing it will have a downward impetus or momentum given them towards the chamber 15 below, which tends to cause the particles carried by the air to separate themselves from it, and deposit in the chamber 15; whilst the air or some of it, containing the lighter particles passes between the tip of a valve or damper 16, and the lower edge of a louvre partition 17 controlled by lever 17', into the chamber 20.

The damper or valve 16 can be moved more or less over the chamber 15, or in an opposite direction, as may be required, for the purposes of separating grades of particles carried by the air as may be desired.

In the case of the wall 17 being louvred as stated, the louvres may be adjustable in the well known way of louvres; and when they are opened some of the air containing the lighter particles will pass into the general expanding and depositing chamber 20, through which the air will slowly flow, namely, at a velocity at which it will not carry in suspension the lightest material; and consequently, it separates out and falls on to the inclined bottom 21 of this chamber, and is conducted down by the inclined diagonal bottom 22 into a box 23, past which it can flow by gravity or otherwise; or it can be conducted away by a conveyor or the like.

In this connection, in the case shown, there is only one receptacle for deposit in the chamber 20, so that all lighter deposits in this case are carried away together.

The chamber 20 may contain any suitable type of filtering or separating device for removing the light particles carried in suspension by the air.

With regard to the louvres being adjustable, this enables the operator to control the track of the air, and at the same time to separate the material extracted into various grades of specific gravity.

A valve similar to the valve 16 may be substituted, if desired for the wall 17.

The discharge passage for air from the chamber 20 is controlled by the hinged valve or damper $22^x$, which can be operated and closed more or less as desired. This valve or damper in the case shown is a pendant one hinged above, but as shown in dotted lines, it may be hinged below, or the discharge velocity of the air otherwise suitably controlled.

The air, ridded of its impurities, is conducted by the conduit 24 to the fan 25, and after passing through the fan is delivered into a conduit 26 of large area along which it will flow at a low velocity; and from this conduit it passes into the large end $9^x$ of the supply air conduit 9, which decreases in area towards the upper delivery end, so that the air when discharged into the grain and the duct 10, will be delivered at a high velocity and considerable pressure.

Thus in this machine the same air may be used continuously over and over again.

Any deposit from the air taking place in the conduit 26 will fall onto the floor of same, and be delivered into a discharge spout 27, provided with a discharge rotary valve 28, by the endless scraper conveyor 29. The material falling into the chamber 12 will be conducted away from same in any known suitable way. The plate or body 8 may be stationary, or adjustable between the discharge air conduit 9 and the passage 11 from the sides of the machine; and the opening between the body 8 and the side of the machine may also be adjustable by means of a plate $8^x$.

This plate or body 8 not only guides the air to the trunk 10, but tends to prevent it following the grain or material.

What is claimed is:—

1. In a machine for purifying grain or like material, including a material inlet, an air conduit delivering air at pressure upwardly and at an angle to the flow of the material, a plate arranged in the path of the material and forming with a fixed wall a conduit to receive the heavier material, a conduit for the passage of the lighter material under the air pressure, said latter conduit having a return bend, and a wall forming a part of the conduit beyond said return bend and formed for the passage of air therethrough.

2. In a machine for purifying grain or like material, including a material inlet, an air conduit delivering air at pressure upwardly and at an angle to the flow of the material, a plate arranged in the path of the material and forming with a fixed wall a conduit to receive the heavier material, a conduit for the passage of the lighter material under the air pressure, said latter conduit having a return bend, and a wall forming a part of the conduit beyond said return bend and formed with air passages for the passage of air therethrough, said air passages in the latter wall being adjustable.

3. In a machine for purifying grain or like material, including a material inlet, an air conduit delivering air at pressure upwardly and at an angle to the flow of the material, a plate arranged in the path of the material and forming with a fixed wall a conduit to receive the heavier material, a conduit for the passage of the lighter material under the air pressure, said latter conduit having a return bend, and a wall forming a part of the conduit beyond said return bend and formed for the passage of air therethrough, the return bend being formed to direct material away from the wall formed with the air passages.

4. In a machine for purifying grain or like material, an upstanding light material conduit formed with a return bend at its upper end, an inlet for delivering material to the lower portion of said conduit, an air conduit for air under pressure for delivering air across the lower end of said conduit and at an angle thereto, and a plate arranged beyond the delivery end of the air conduit and in line with the light material conduit, said plate extending below the light material conduit and forming a guide behind which the heavier material falls free of the air current.

5. In a machine for purifying grain or other granular material, the combination of a grain or material inlet, an air supply conduit disposed directly below the inlet and adapted to deliver the air upwards, an upcast shaft directly above the air and material inlets, a plate or body disposed between the front and back walls of the upcast shaft and in the lower end of same, and forming a space or passage between itself and the back wall, adapted to allow of the fall of material which has been lifted by the air, substantially as set forth.

6. In a machine for purifying grain or other granular material, the combination of a grain or material inlet, an air supply conduit disposed directly below the inlet and adapted to deliver the air upwards, an upcast shaft directly above the air and material inlets, a plate or body disposed between the front and back walls of the upcast shaft and in the lower end of same, and forming a space or passage between itself and the back wall, adapted to allow of the fall of material which has been lifted by the air.

7. In a machine for purifying grain or other granular material, the combination of a grain or material inlet, an air supply conduit disposed directly below the inlet and adapted to deliver the air upwards, an upcast shaft directly above the air and material inlets, a plate or body disposed between the front and back walls of the upcast shaft and in the lower end of same, and forming a space or passage between itself and the back wall, adapted to allow of the fall of material which has been lifted by the air, and a downcast conduit adapted to direct the heavier particles carried in suspension in the air, towards the wall of the upcast shaft or conduit, and away from the exit for the air from the said downcast conduit.

In testimony whereof I have signed my name to this specification.

JOHN FREDERICK BISHOP.